UNITED STATES PATENT OFFICE.

HERMAN M. SUSS, OF FALL RIVER, MASSACHUSETTS.

CORE-FILLING COMPOUND FOR PNEUMATIC TIRES AND PROCESS OF MAKING THE SAME.

1,041,526.
No Drawing.

Specification of Letters Patent. Patented Oct. 15, 1912.

Application filed July 27, 1911. Serial No. 640,765.

*To all whom it may concern:*

Be it known that I, HERMAN M. SUSS, a citizen of the United States, residing at Fall River, in the county of Bristol and State of Massachusetts, have invented certain new and useful Improvements in Core-Filling Compounds for Pneumatic Tires and Processes of Making the Same; and I do declare the following to be a full, clear, and exact description of the invention, such as will enable others skilled in the art to which it appertains to make and use the same.

This invention relates to a new and useful composition of matter for filling the cores of tires, and is chiefly designed to prolong the life and period of usefulness of pneumatic tires and to render them invulnerable and puncture-proof.

My improved composition consists of the following ingredients combined in the proportions stated, viz: cabinet glue, forty (40) parts; water, twenty (20) parts; brown sugar, twenty (20) parts; silicate of soda in solution, said solution being thirty per cent.; twenty per cent. silicate, and ten per cent. soda, fifteen (15) parts, and glycerin, five (5) parts by measure.

In preparing the above composition, the glue is placed in the water and allowed to stand until the water is absorbed. This mass is then placed in a steam-jacketed kettle and heated until the same runs freely. The brown sugar is now added and these ingredients boiled for one hour. The silicate of soda and glycerin are now added and the mass permitted to boil for half an hour, during which the same is constantly agitated.

In using the above-named composition, the liquid is pumped into the tires while hot and until the tire is full. When this filling cools it sets and forms a core that is not affected by heat or cold, and will not decompose or melt.

My improved core when prepared as above described will cool and set in about three hours and a tire equipped therewith will be found to be firm, elastic and to possess all the resiliency of a pneumatic tire and is more durable.

Having thus described the invention, I claim:

1. A process of producing a composition for filling the cores of pneumatic tires, which consists in placing 40 parts of cabinet glue in 20 parts of water and allowing it to remain until the water is absorbed by the glue, then heating the so formed mass until it runs freely, then adding 20 parts of brown sugar and boiling the ingredients together for one hour, then adding fifteen parts of silicate of soda and five parts of glycerin to the mass and boiling them for half an hour constantly agitating them during the boiling thereof.

2. A core filling compound for pneumatic tires composed of cabinet glue forty parts, water twenty parts, brown sugar twenty parts, silicate of soda fifteen parts, and glycerin five parts.

In testimony whereof I have hereunto set my hand in presence of two subscribing witnesses.

HERMAN M. SUSS.

Witnesses:
WILLIAM M. REGAN,
EDWARD F. BABBITT.